Dec. 29, 1953  A. C. DE MELLO  2,663,966
ADJUSTABLE FISHHOOK STRUCTURE
Filed Sept. 19, 1950
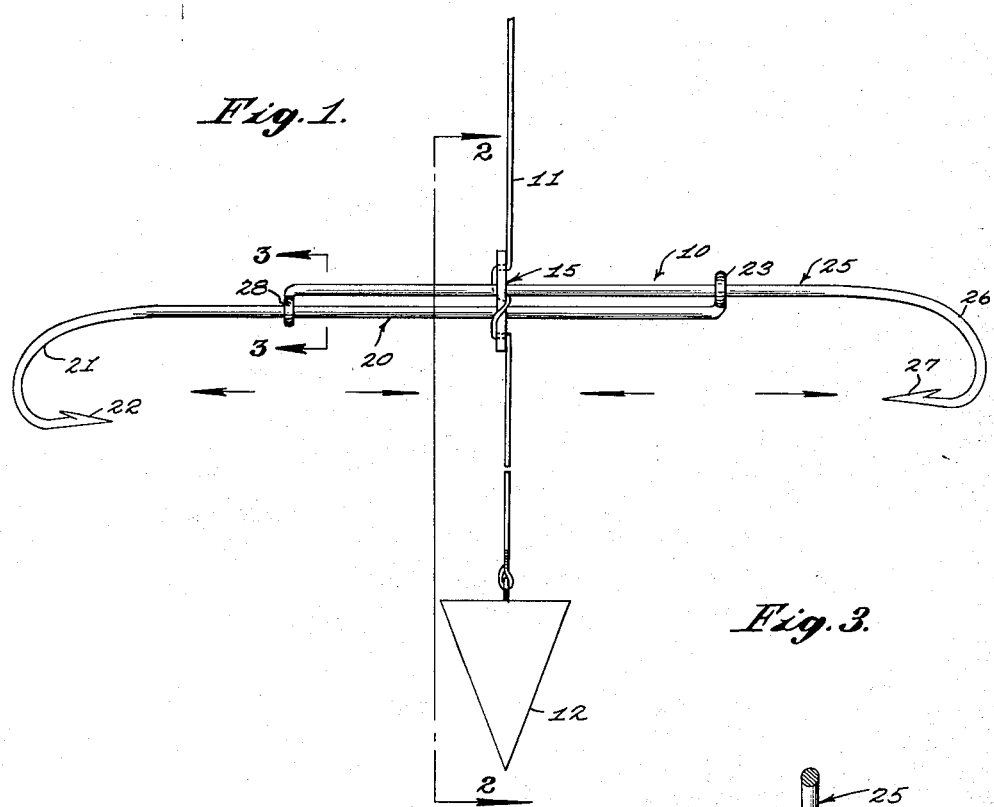
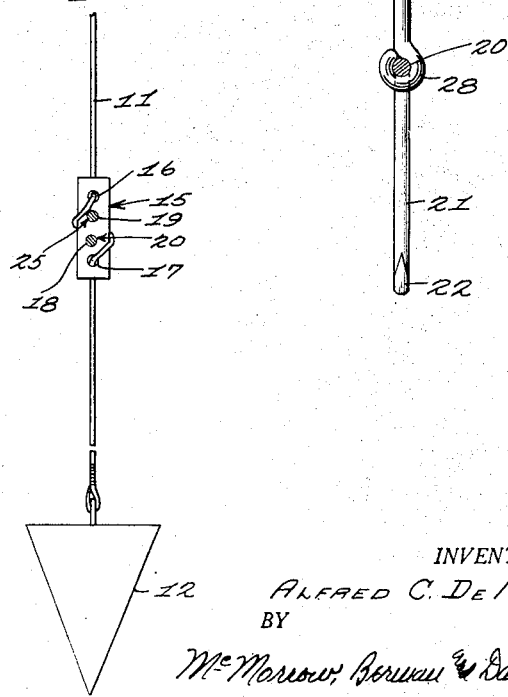
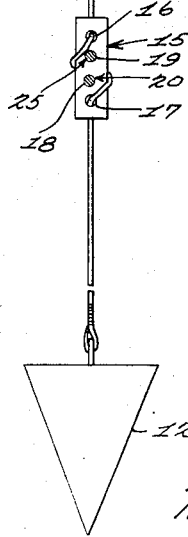
INVENTOR.
ALFRED C. DE MELLO
BY
McMorrow, Berman & Davidson
ATTORNEYS Patented Dec. 29, 1953

2,663,966

UNITED STATES PATENT OFFICE 2,663,966

ADJUSTABLE FISHHOOK STRUCTURE

Alfred C. DeMello, New Bedford, Mass.

Application September 19, 1950, Serial No. 185,547

1 Claim. (Cl. 43—42.74)

This invention relates to fishing equipment, and more particularly to an adjustable fishhook structure.

An object of this invention is to provide a fishhook structure adapted for attachment to a fishing line in a manner wherein snagging of the line by the fishhooks of the structure is effectively eliminated.

Another object of this invention is to provide a fishhook structure including a pair of hooks disposed in face-to-face relation with respect to each other and mounted for movement toward and away from each other to thereby vary the spacing of the hooks with respect to a line secured therebetween.

A further object of this invention is to provide an adjustable fishhook structure which is relatively simple in construction, cheap to manufacture, and easy to assemble.

The above and still further objects and advantages of the present invention will become apparent upon consideration of the following detailed description of the invention when taken in conjunction with the accompanying drawings, wherein:

Figure 1 is an elevational view of the adjustable fishhook structure of the present invention, shown attached to a fishing line carrying a depending sinker;

Figure 2 is a sectional view taken along the line 2—2 of Figure 1; and

Figure 3 is a sectional view taken along the line 3—3 of Figure 1.

Referring now more particularly to the drawings, wherein like reference numerals have been used throughout the several views to designate like parts, there is shown the adjustable fishhook structure of the present invention, generally designated by the reference numeral 10, supported on a fishing line 11 carrying a depending sinker 12.

The fishhook structure embodies a supporting link 15 formed as an elongated plate which is adapted for securement to the fishing line 11 by means of the spaced apertures 16 and 17 provided contiguous to the ends of the supporting link 15. As clearly shown in Figure 2, the apertures extend transversely of the supporting link between opposed faces thereof, and the fishing line 11 is extended through the aperture 16 from one face of the supporting link, wrapped around the link, and extended through the aperture 17 from the opposite face of the link, to thereby detachably secure the link to the line in a select position therealong.

Disposed transversely of the supporting plate 15 is a first elongated shank 20 which is slidably supported intermediate its ends in the aperture 18 provided in the supporting link 15. One end of the first shank 20 is bent to form a first depending hook 21 including a barbed free end 22 and the other end of the shank 20 is bent to form a first transversely disposed eyelet 23.

Positioned in spaced, parallel relation with respect to the first shank 20 is a second shank 25 which is slidably supported intermediate its ends in the transversely extending aperture 19 provided in the supporting link 15. One end of the second shank 25 is loosely extended through the eyelet 23 and bent to form a second depending hook 26 including a barbed point 27, the hook 26 being disposed in face-to-face relation with respect to the hook 21. The other end of the shank 25 is bent to form a second transversely extending eyelet 28 which is loosely circumposed about the first shank 20 on the opposite side of the supporting link 15 with respect to the eyelet 23.

As clearly shown in Figures 2 and 3, the bounding portions of the apertures 18 and 19 bear against the shanks 20 and 25 and similarly, the bounding portions of the eyelets 23 and 28 engage the shanks. Accordingly, upon manually grasping the shanks 20 and 25 and imparting an inwardly or outwardly directed force to the shanks, the positioning of the hooks 21 and 26 with respect to each other and with respect to the fishing line 11 can be selectively varied. Due to the contact between the shanks and the supporting structures, the supporting link 15 and the eyelets 23 and 28, the hooks will be maintained in the select position of adjustment desired until a later adjustment. It is to be noted that the hooks 21 and 26 depend downwardly, and accordingly will engage the bottom jaw of the fish to be caught. It is to be further noted that the outermost limit of movement of the hooks with respect to each other can be selectively varied by increasing or decreasing the length of the shanks employed.

Although only one embodiment of the fishhook structure of the present invention has been described, it is readily apparent that numerous modifications can be made without departing from the spirit of the invention as set forth in the appended claim.

What I claim is:

In a fishhook structure for support from a fishing line, a supporting plate provided with means for the attachment of an intermediate portion of a fishing line thereto, a first shank disposed transversely of and slidably supported in said supporting plate, one end of said shank being bent to form a first depending hook and the other end of said shank being bent to form a first transversely disposed eyelet, and a second shank disposed in superimposed spaced parallel relation with respect to said first shank and slidably supported in said supporting plate and first eyelet, one end of said second shank being bent to form a second depending hook and the other end of said second shank being bent to form a second transversely extending eyelet, said first shank being slidably supported in said second eyelet, and said first and second depending hooks being so disposed as to face each other.

ALFRED C. DE MELLO.

References Cited in the file of this patent

UNITED STATES PATENTS

| Number | Name | Date |
|---|---|---|
| 353,412 | Behrens | Nov. 30, 1886 |
| 1,357,678 | Bain | Nov. 2, 1920 |
| 1,556,228 | Lewis | Oct. 6, 1925 |
| 2,390,584 | Hardin | Dec. 11, 1945 |

FOREIGN PATENTS

| Number | Country | Date |
|---|---|---|
| 23,577 | Great Britain | Aug. 1, 1912 |
| 116,413 | Sweden | Mar. 21, 1946 |